United States Patent
Maheswaran et al.

(10) Patent No.: US 11,475,459 B2
(45) Date of Patent: Oct. 18, 2022

(54) SYSTEM AND METHOD FOR CLASSIFICATION OF CUSTOMER QUERY

(71) Applicant: PM Labs, Inc., Walnut, CA (US)

(72) Inventors: Arjun Maheswaran, Bangalore (IN); Akhilesh Sudhakar, Chennai (IN)

(73) Assignee: PM Labs, Inc., Walnut, CA (US)

( * ) Notice: Subject to any disclaimer, the term of this patent is extended or adjusted under 35 U.S.C. 154(b) by 337 days.

(21) Appl. No.: 16/825,891

(22) Filed: Mar. 20, 2020

(65) Prior Publication Data
US 2021/0295347 A1    Sep. 23, 2021

(51) Int. Cl.
G06Q 30/00    (2012.01)
G06F 40/284   (2020.01)
G06F 17/18    (2006.01)
G06F 40/35    (2020.01)

(52) U.S. Cl.
CPC .......... *G06Q 30/016* (2013.01); *G06F 17/18* (2013.01); *G06F 40/284* (2020.01); *G06F 40/35* (2020.01)

(58) Field of Classification Search
None
See application file for complete search history.

(56) References Cited

U.S. PATENT DOCUMENTS

| | | | |
|---|---|---|---|
| 7,917,497 B2 | 3/2011 | Harrison et al. | |
| 10,554,817 B1 * | 2/2020 | Sullivan | G06N 3/006 |
| 11,080,701 B2 * | 8/2021 | Scott | G06Q 20/40 |
| 11,120,217 B2 * | 9/2021 | Maes | G06F 40/211 |
| 11,178,281 B2 * | 11/2021 | Butler | H04M 3/5141 |
| 11,290,400 B2 * | 3/2022 | Fejes | H04M 3/5175 |
| 11,354,651 B2 * | 6/2022 | Ortiz | G06Q 20/382 |
| 2008/0255845 A1 * | 10/2008 | Bennett | G06F 40/216 704/E15.047 |
| 2010/0185668 A1 * | 7/2010 | Murphy | H04L 67/2838 707/E17.014 |
| 2011/0106617 A1 | 5/2011 | Cooper et al. | |
| 2013/0007037 A1 * | 1/2013 | Azzam | G06F 16/3329 707/769 |
| 2018/0121801 A1 | 5/2018 | Zhang | |
| 2018/0253727 A1 * | 9/2018 | Ortiz | G06Q 20/108 |

FOREIGN PATENT DOCUMENTS

| | | |
|---|---|---|
| CN | 110032632 A | 7/2019 |
| WO | 2014127301 A2 | 8/2014 |

* cited by examiner

*Primary Examiner* — Ariel Mercado
(74) *Attorney, Agent, or Firm* — Jason C. Cameron (57) ABSTRACT

A system for classification of a customer query is disclosed. The system includes a customer interaction subsystem to receive the customer query from a customer, and a tokenizer subsystem to split the customer query into tokens. The system also includes a multitask profiler subsystem including a mapping module to map the tokens with pre-trained embedding data to assign mathematical codes to the tokens, an attention module to apply attention models hierarchically on a contextual embedding layer to obtain contextual mathematical codes corresponding to the tokens based on the mathematical codes, a classification module to classify the multiple tokens into profiles based on the contextual mathematical codes, and a profile generator to generate a human readable profile and a machine-readable profile based on the profiles. The machine-readable profile and the human readable profile includes at least one of a customer profile, a product profile, an issue profile or a combination thereof.

13 Claims, 4 Drawing Sheets

SYSTEM AND METHOD FOR CLASSIFICATION OF CUSTOMER QUERY

BACKGROUND

Embodiment of the present disclosure relates to an information processing system and more particularly to a system and a method for classification of customer query.

Presently, customer care agents and other customer service providers handle customer queries and troubleshoot customer issues on a frequent basis. Such queries vary over a wide range of topics, each topic belonging to a different domain. However, it is difficult for a customer care agent to segregate these queries to their respective domains and answer the customer within a stipulated time because the queries belong to a various domain and differ in nature. Such human assisted categorization systems may require a significant amount of time and effort by the customer care agent to obtain an answer.

Furthermore, with advancement in technology, various supervised and unsupervised methods have been proposed for text categorization, but none of them are found suitable due to the paucity of labeled data and irrelevant cluster formation. Such existing unsupervised methods do not incorporate the valuable domain expert knowledge into the learning process. Additionally, such existing supervised methods require a large amount of training data which is hardly available in the case of customer interaction categorization. Hence, less training data means less classification accuracy.

Hence, there is a need for an improved system and method for classification of customer query to address the aforementioned issue(s).

BRIEF DESCRIPTION

In accordance with an embodiment of the present disclosure, a system for classification of customer query is provided. The system includes a customer interaction subsystem configured to receive the customer query from a customer. The system also includes a tokenizer subsystem operatively coupled to the customer interaction subsystem. The tokenizer subsystem is configured to split the customer query into a plurality of tokens. The system further includes a multitask profiler subsystem operatively coupled to the tokenizer subsystem. The multitask profiler subsystem includes a mapping module configured to map the plurality of tokens with pre-trained embedding data to assign a plurality of mathematical codes to the corresponding plurality of tokens. The multitask profiler subsystem also includes an attention module operatively coupled to the mapping module. The attention module is configured to apply a plurality of attention models hierarchically on a contextual embedding layer to obtain a plurality of contextual mathematical codes corresponding to the plurality of tokens based on the plurality of mathematical codes. The multitask profiler subsystem further includes a classification module operatively coupled to the attention module. The classification module is configured to classify the plurality of tokens into a plurality of profiles based on the plurality of contextual mathematical codes. The multitask profiler subsystem further includes a profile generator module operatively coupled to the classification module. The profile generator module is configured to generate a human readable profile and a machine-readable profile based on the plurality of profiles. The machine-readable profile and the human readable profile include at least one of a customer profile, a product profile, an issue profile or a combination thereof.

In accordance with another embodiment of the present disclosure, a method for classification of customer query is provided. The method includes receiving, by a customer interaction subsystem, the customer query from a customer. The method also includes splitting, by a tokenizer subsystem, the customer query into a plurality of tokens. The method further includes mapping, by a mapping module, the plurality of tokens with pre-trained embedding data to assign a plurality of mathematical codes to the corresponding plurality of tokens. The method further includes applying, by an attention module, a plurality of attention models hierarchically on a contextual embedding layer to obtain a plurality of contextual mathematical codes corresponding to the plurality of tokens based on the plurality of mathematical codes. The method further includes classifying, by a classification subsystem, the plurality of tokens into a plurality of profiles based on the plurality of contextual mathematical codes. The method further includes generating, by profile generator module, a human readable profile and a machine-readable profile based on the plurality of profiles, wherein the machine-readable profile and the human readable profile comprises at least one of a customer profile, a product profile and an issue profile or a combination thereof.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclose relate to system and method for classification of the customer query. The system includes a customer interaction subsystem configured to receive the customer query from a customer. The system also includes a tokenizer subsystem operatively coupled to the customer interaction subsystem. The tokenizer subsystem is configured to split the customer query into multiple tokens. The system further includes a multitask profiler subsystem operatively coupled to the tokenizer subsystem. The multitask profiler subsystem includes a mapping module configured to map the multiple tokens with pre-trained embedding data to assign mathematical codes to the corresponding tokens. The multitask profiler subsystem also includes an attention module operatively coupled to the mapping module. The attention module is configured to apply models hierarchically on a contextual embedding layer to obtain a plurality of contextual mathematical codes corresponding to the tokens based on the mathematical codes. The multitask profiler further includes a classification module operatively coupled to the attention module. The classification module is configured to classify the multiple tokens into profiles based on the plurality of contextual mathematical codes. The multitask profiler subsystem further includes a profile generator module operatively coupled to the classification module. The profile generator module is configured to generate a human readable profile and a machine-readable profile based on the profiles. The machine-readable profile and the human readable profile include at least one of a customer profile, a product profile, an issue profile or a combination thereof.

Figure 1:
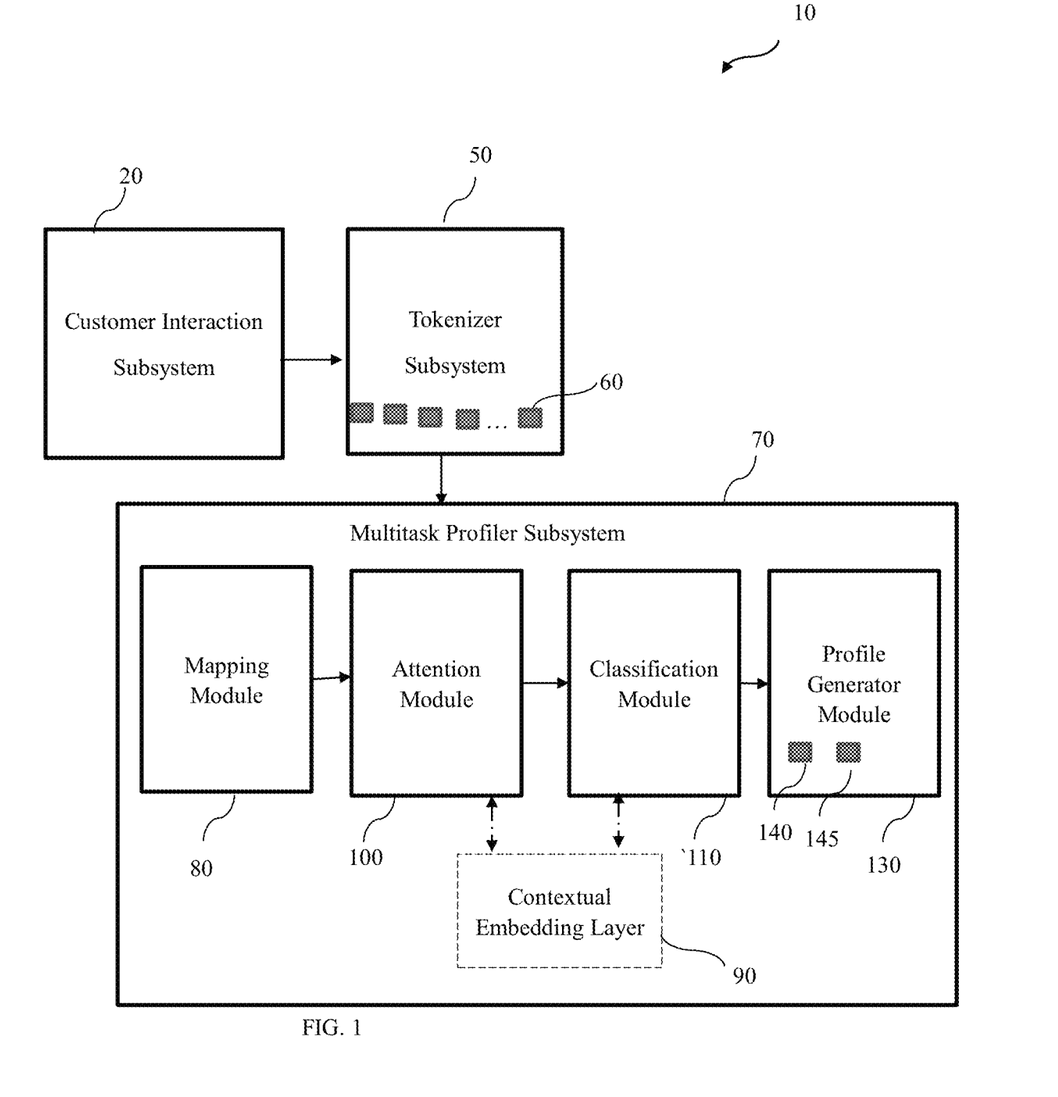
FIG. 1 is a block diagram representation of a system for classification of a customer query in accordance with an embodiment of the present disclosure.

FIG. 1 is a block diagram representation of a system 10 for classification of a customer query in accordance with an embodiment of the present disclosure. The system 10 includes a customer interaction subsystem 20 to receive a customer query from a customer. In such embodiment, the customer may interact with the customer interaction subsystem 20 via a customer interface (not shown in FIG. 1). In such embodiment, the customer interface may be an interface of a mobile phone or a computer system. The customer interface and the customer interaction subsystem 20 communicate via a network (not shown in FIG. 1). In one embodiment, the network may be a wired network such as local area network (LAN). In another embodiment, the network may be a wireless network such as wi-fi, radio communication medium or the like. In one embodiment, the customer query may include text or voice of a customer interaction.

The customer interaction subsystem 20 may receive the customer query from the customer in a form of at least one of web content, text of a chat session, an email, a short messaging service, a voice call, a voice message or the like. In such embodiment, the voice call or the voice message may be converted into text using a voice to text conversion technique. In a specific embodiment, the system 10 may be located on a local server. In another embodiment, the system 10 may be located on a cloud server.

Furthermore, the system 10 also includes a tokenizer subsystem 50 operatively coupled to the customer interaction subsystem 20. The tokenizer subsystem 50 splits the customer query into multiple tokens 60. In detail, the tokenizer subsystem 50 splits the text of customer query into minimal meaningful units. To split the customer query into minimal meaningful units, the tokenizer subsystem 50 splits the text of the customer query into the multiple tokens 60 by identifying the end point of a word and beginning of the next word which are called as word boundaries. Upon identification of the boundaries, the tokenizer subsystem 50 splits the customer query into sentences and sentences into the multiple tokens 60. In one embodiment, the multiple tokens 60 may include words, numbers, punctuation marks, phrases, date, email address, universal resource locator (URL) or the like.

The system 10 further includes a multitask profiler subsystem 70 operatively coupled to the tokenizer subsystem 50. The multitask profiler subsystem 70 includes a mapping module 80 to map the multiple tokens with pre-trained embedding data to assign mathematical codes to the corresponding multiple tokens 60. The pre-trained embedding data includes a form of word representation that bridges the human understanding of language to that of a machine. The pre-trained embedding data includes distributed representations of text in an n-dimensional space and is a learned representation for text where words which have the same meaning have a similar representation. The pretrained embedding data includes the word representation in a form of mathematical codes which is a public data related to various domains. As used herein, the mathematical code is a numeric representation of each word. The numeric representation may be in a form of vector or an array. Upon mapping, the mapped data is further stored in a contextual embedding layer 90.

Subsequently, the multitask profiler subsystem 70 includes an attention module 100 to apply various attention models hierarchically on the contextual embedding layer 90 to obtain a plurality of contextual mathematical codes corresponding to the multiple tokens 60 based on the mathematical codes. In one embodiment, the attention models may belong to various deep learning models. The various attention models are applied to obtain representation of the sentences such that the representation carries information of context. The attention module obtains the mathematical codes corresponding to each token in the customer query. Further, upon obtaining the mathematical codes for each token in the customer query, the attention module obtains mathematical codes corresponding to sentence of the customer query.

Based on the mathematical codes for the tokens 60 and the mathematical codes for the sentence, the attention module 100 assigns contextual mathematical codes to each of the tokens 60. The contextual embedding layer 90 provides domain specific learning to the various attention models which further helps the attention module 100 to assign domain and context specific contextual mathematical codes to each of the tokens. Upon identification of the context using attention models and the contextual mathematical codes, the attention module 100 may identify a product detail, an issue detail and a customer detail from the customer query.

Moreover, the multitask profiler subsystem 70 further includes a classification module 110 to classify the multiple tokens 60 into profiles based on the contextual mathematical codes. Upon identification of the context using attention models and the contextual mathematical codes, the attention module 100 may identify a product detail, an issue detail and a customer detail from the customer query. In one embodiment, the profiles may include a product profile, an issue profile and a customer profile. Once the product, the issue, the customer details are identified in the customer query, the classification module 110 classifies the customer query into, a product profile, an issue profile and a customer profile wherein a category profile, a brand profile or the like are predefined. The category profile represents the category to which the product belongs (for example, a shirt belongs to 'clothing' category). The brand profile represents the brand to which the product belongs (for example, shirt belongs to XYZ brand). The profiles are representative of corresponding mathematical contextual codes.

In one embodiment, the various attention models may include a category attention model, a brand attention model, a product attention model, an issue attention model and a customer attention model. In detail, the attention module 110 applies category attention model on the contextual embedding layer 90 to generate a first contextual mathematical code for the category present in the customer query. Further, the attention module 110 applies the brand attention model over the category attention to generate a second contextual mathematical code for the brand present in the customer query.

More specifically, the brand attention model focuses on the brand related words to distinguish between the brands. Similarly, the product attention model or the issue attention model are applied on the profiles to generate a specific mathematical code for the word on which the attention model should focus on. For example, the issue attention is applied to distinguish the issue present in the customer query. Hence, each profile attains contextual mathematical code from the previous profile in the hierarchy and applies the corresponding attention model to generate contextual mathematical codes for the next profile in the hierarchy.

Once the profiles are identified, a profile generator module 130 of the multitask profiler subsystem 70 generates a human readable profile 140 based on the profiles. The human readable profile includes a human readable product profile, a human readable issue profile and a human readable customer profile. The human readable profile including the human readable product profile, the human readable issue profile and the human readable customer profile are obtained by converting the contextual mathematical codes into human readable language using various conversion techniques.

In addition, the profiler generator subsystem 130 of the multitask profiler subsystem 70 generates a machine-readable profile 145 by applying various mathematical operations on the profiles. In some embodiments, the various mathematical operations may include at least one of an average of the plurality of profile, a weighted average of the plurality of profiles, concatenation of the plurality of profiles or the like or a combination thereof. In an exemplary embodiment, the machine-readable profile may be obtained by calculating a first weighted average of the product profile and the issue profile. The first weighted average is further concatenated with the brand profile to obtain a first concatenation result. The profile generator module 130 calculates a second weighted average of the first concatenation result and the category attention and a second concatenation of the second weighted average and the customer profile. The second concatenation result in the machine-readable profile 145.

In a specific embodiment, the machine-readable profile 145 and the human readable profile 140 are utilized to generate a response corresponding to the customer query. The response of the customer query may be generated based on historical data. The historic data may include historic customer queries and corresponding responses and other attributes relevant to the query. The historic queries are converted to obtain corresponding machine-readable profiles and such machine-readable profiles are compared with the machine-readable profile 145 of the current customer query. Upon comparison, the historic machine-readable profile which is closest to the machine-readable profile 145 of the current customer query is selected and is adapted to generate the response for the current customer query.

Figure 2:
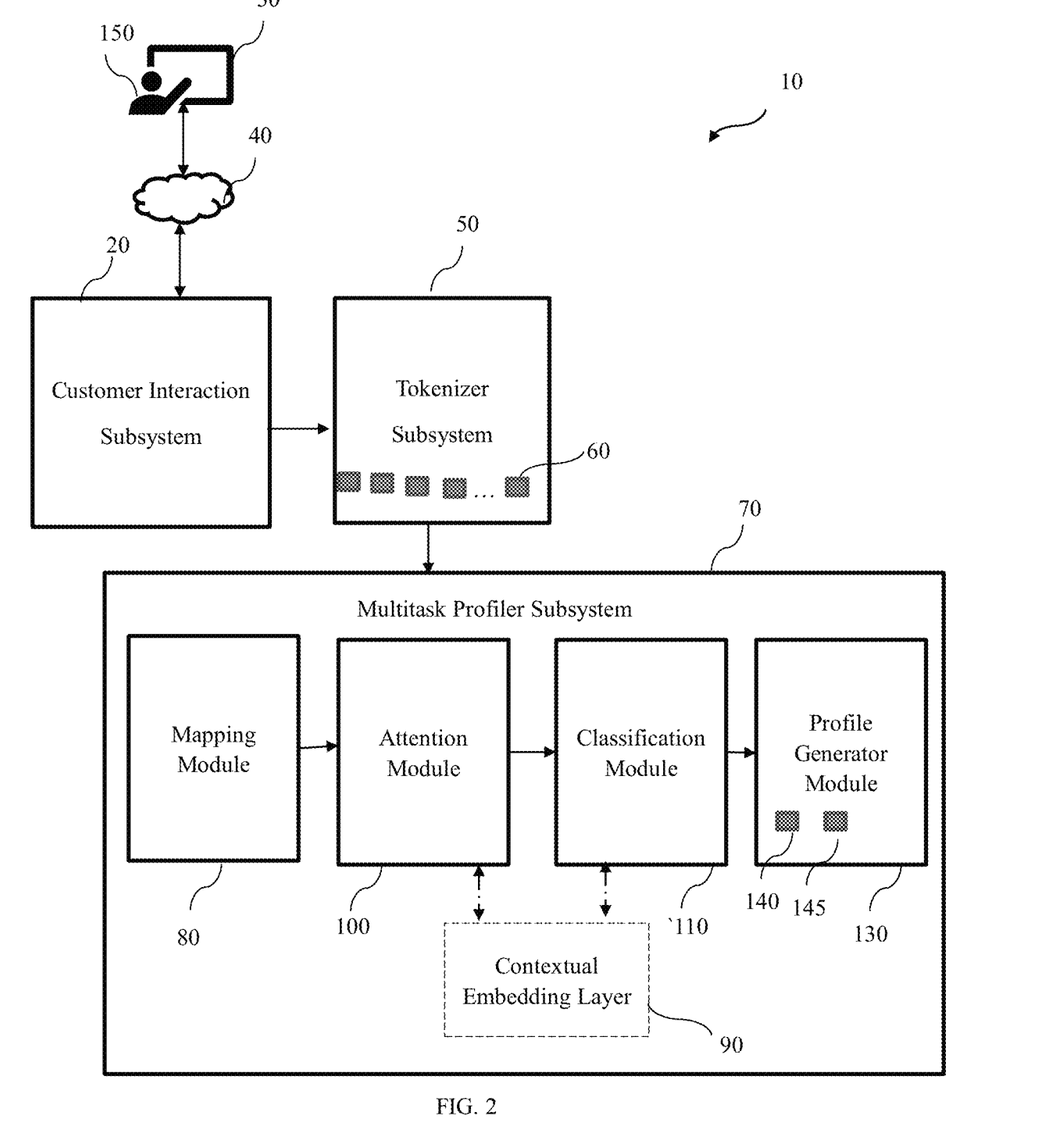
FIG. 2 is a block diagram representation of an exemplary system for classification of the customer query in accordance with an embodiment of the present disclosure.

FIG. 2 is a block diagram representation of an exemplary system 10 for classification of the customer query of FIG. 1 in accordance with an embodiment of the present disclosure. Considering an example where a customer has an issue with a baby care product diaper. The customer 150 registers his issue on a customer support page of an e-commerce website. The customer interaction subsystem 20 of the system 10 receives the customer query via an email registered on the customer support page. The customer 150 interacts with the customer interaction subsystem 20 through the customer interface 30 of a mobile phone via the network 40. The email includes a text "My kid's size-5 XYZ brand diaper pants which came in a pack of 20 were leaking from the sides". The customer interaction subsystem 20 also receives the category and customer contact information such as name "x" and contact details "y" along with the email.

Upon receiving the customer query, the tokenizer subsystem 50 of the system 10 identifies the boundaries of each word to determine start and end point of each word. The tokenizer subsystem 50 further splits the sentences of the email into multiple tokens 60 based on identified boundaries of the words, wherein a token represents a word. For example, the multiple tokens 60 are "My", "kid's" "size-5" "XYZ" "brand" "diaper" "pants" "which" "came" "in" "a" "pack" "of" "20" "were" "leaking" "from" "the" "sides". Further, the mapping module 80 of the multitask profiler subsystem 70 receives multiple tokens 60 and map such tokens 60 with the pretrained embedding data, where the mapping module 80 assigns mathematical codes to corresponding tokens. Referring to the above-mentioned example, token "diaper" is "2342", "XYZ" is "1011" and "leaking" is "2013". The mathematical codes assigned here are exemplary representation and may be represented by vectors or array of numbers which are in large size (approximately $10^4$ or more) in reality.

Furthermore, the attention module 100 of the multitask profiler subsystem 70 applies various attention models on the contextual embedding layer 90 to obtain representation of the sentences (email) and words (tokens) such that the representation carries information of context. Such representation includes contextual mathematical codes. The attention module 100 obtains the mathematical codes corresponding to each token 60 in the customer query and the mathematical code for entire sentences of the email. The contextual embedding layer 90 reassigns the mathematical codes to each token which is more specific to context and domain. For example, "diaper" is "1432", "XYZ" is "1199" and "leaking" is "1302".

Upon identification of the context using attention models and the contextual mathematical codes, the attention module 100 applies category attention model on the contextual embedding layer 90 to generate a first contextual mathematical code such as for "baby care product" in the aforementioned example for the category present in the customer query. Similarly, each attention model is applied on the previous class to obtain the contextual mathematical codes. Continuing the same example, the attention module 110 applies the brand attention model over the category attention "baby care" with code "1010", issue attention model and the product attention model on the brand attention "XYZ" "1199" to predict issue, product and customer profile from the email.

Moreover, the classification module 110 of the multitask profiler subsystem 70 classifies the multiple tokens 60 into profiles based on such contextual mathematical codes. The classification module 110 classifies the token into "baby care category", "XYZ brand", "diaper pants/size-5/count-20 product", "quality issue/leaking issue/sides issue" and customer name "x" and contact detail "y". Upon identification of profiles, the profile generator module 130 of the multitask profiler subsystem 70 generates a human readable profile 140 by converting the contextual mathematical codes corresponding to the product, issue and customer into human readable language.

In addition, the profile generator module 130 generates a machine-readable profile 145 by applying various mathematical operations on the contextual mathematical codes corresponding to the profiles. Continuing with the ongoing example, in a particular scenario, the machine-readable profile 145 is generated by calculating a first weighted average of the product profile "1432" and the issue profile "1302". The first weighted average (for example, "1312") is further concatenated with the brand profile "1199" to obtain a first concatenation result (for example, 13121199). The profile generator module 130 calculates a second weighted average of the first concatenation result "13121199" and the category attention (for example "0303") and a second concatenation of the second weighted average (say, 1313) and the customer profile (say, "2210") to obtain a machine readable profile (say "13132210"). In one embodiment, the profile generator module 130 may assign higher weightage to the profiles according to the pre-set priority. In an exemplary embodiment, the profiler generator module assigns a higher weightage to brand as per the pre-set priority.

Once the human readable profile 140 and the machine readable profile 145 is generated, the profile generator module 130 maps such human readable profile 140 and the machine-readable profile 145 with the historical data (issue related to diapers of other brands) and identifies the response corresponding to the similar issue to generate response for the customer query.

Figure 3:
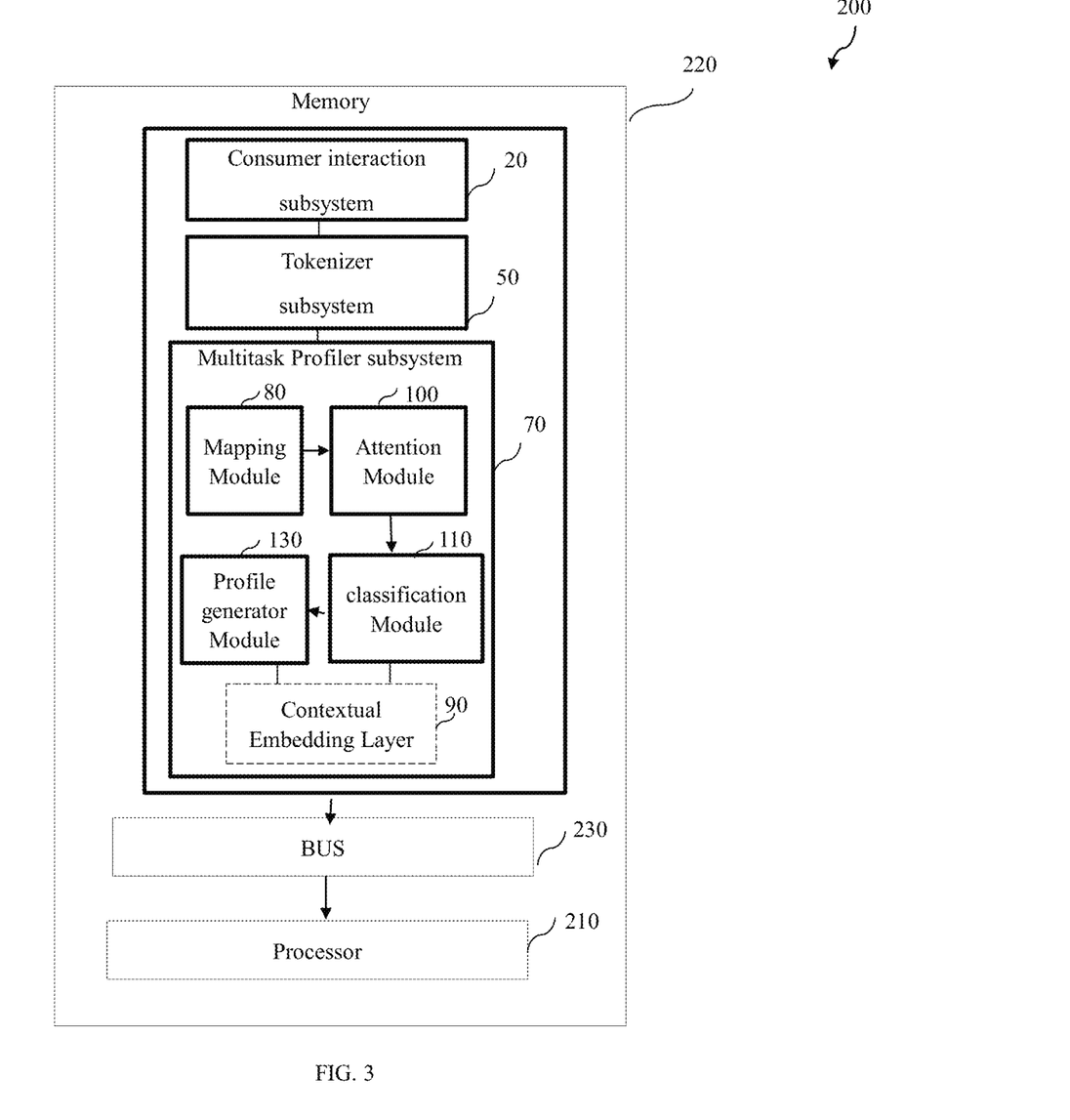
FIG. 3 is a block diagram of a computer or a server in accordance with an embodiment of the present disclosure.

FIG. 3 is a computer or a server 200 for the system for classification of the customer query in accordance with an embodiment of the present disclosure. The server includes processor(s) 210, and memory 220 operatively coupled to the bus 230.

The processor(s) 210, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 220 includes a plurality of subsystems stored in the form of executable program which instructs the processor 210 to perform the method steps illustrated in FIG. 1. The memory 220 has following subsystems: a customer interaction subsystem 20, a tokenizer subsystem 50 and a multitask profiler subsystem 70 including a mapping module 80, an attention module 100, a classification module 110 and a profile generator module 130.

The memory 220 includes a customer interaction subsystem 20 configured to receive the customer query from a customer. The memory 220 also includes a tokenizer subsystem 50 operatively coupled to the customer interaction subsystem 20. The tokenizer subsystem 50 is configured to split the customer query into a plurality of tokens. The memory 220 further includes a multitask profiler subsystem 70 operatively coupled to the tokenizer subsystem 50. The multitask profiler subsystem 70 includes a mapping module 80 configured to map the plurality of tokens with pre-trained embedding data to assign a plurality of mathematical codes to the corresponding plurality of tokens. The multitask profiler subsystem 70 also includes an attention module 100 operatively coupled to the mapping module. The attention module is configured to apply a plurality of attention models hierarchically on a contextual embedding layer 90 to obtain a plurality of contextual mathematical codes corresponding to the plurality of tokens based on the plurality of mathematical codes.

The multitask profiler subsystem 70 further includes a classification module 110 operatively coupled to the attention module 100. The classification module 110 is classifies the multiple tokens into profiles based on the contextual mathematical codes. The multitask profiler subsystem 70 further includes a profile generator module 130 operatively coupled to the classification module 110. The profile generator module 130 is configured to generate a human readable profile and a machine-readable profile based on the profiles. The machine-readable profile and the human readable profile include at least one of a customer profile, a product profile, an issue profile or a combination thereof.

Computer memory 220 elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable programs stored on any of the above-mentioned storage media may be executable by the processor(s) 210.

Figure 4:
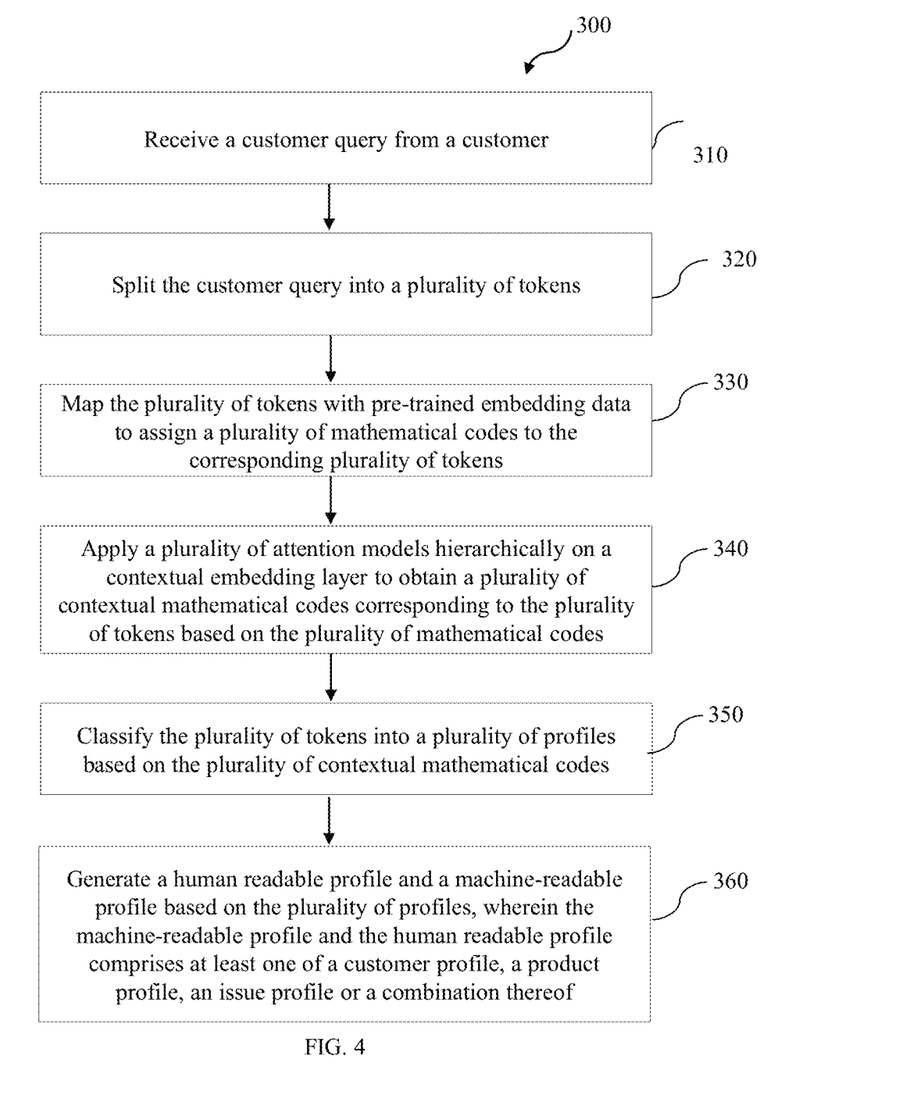
FIG. 4 is a flow chart representing the steps involved in a method for classification of the customer query in accordance with an embodiment of the present disclosure.

FIG. 4 is a flow chart representing the steps involved in a method 300 for classification of customer query in accordance with an embodiment of the present disclosure. The method 300 includes receiving the customer query from a customer in step 310. In one embodiment, receiving the customer query from a customer via a customer interaction subsystem. In some embodiments, receiving the customer query may include receiving text or voice of customer interaction. In such embodiment, receiving text or voice of customer interaction may include receiving at least one of web content, text of a chat session, an email, a short messaging service, a voice call or a voice message.

The method 300 also includes splitting the customer query into a plurality of tokens in step 320. In one embodiment, splitting the customer query into a plurality of tokens via a tokenizer subsystem. In some embodiments, splitting the customer query may include splitting the text of the customer query into the multiple tokens by identifying the end point of a word and beginning of the next word which are called as word boundaries. In such embodiment, splitting the text of the customer query into the multiple tokens may include splitting the text of the customer query into words, numbers, punctuation marks, phrases, date, email address, universal resource locator (URL) or the like.

The method 300 further includes mapping the plurality of tokens with pre-trained embedding data to assign a plurality of mathematical codes to the corresponding plurality of tokens in step 330. In one embodiment, mapping the plurality of tokens with pre-trained embedding data to assign a plurality of mathematical codes to the corresponding plurality of tokens via a mapping module of a multitasker profiler subsystem. In some embodiments, the pre-trained embedding data includes distributed representations of text in an n-dimensional space and is a learned representation for text where words which have the same meaning have a similar representation. In such embodiment, the pretrained embedding data includes the word representation in a form of mathematical codes. The mathematical code is a numeric representation of each word and carries meaning of the word. The numeric representation may be in a form of vector or an array.

Furthermore, the method 300 includes applying a plurality of attention models hierarchically on a contextual embedding layer to obtain a plurality of contextual mathematical codes corresponding to the plurality of tokens based on the plurality of mathematical codes in step 340. In one embodiment, applying a plurality of attention models hierarchically on a contextual embedding layer to obtain a plurality of contextual mathematical codes corresponding to the plurality of tokens via an attention module of the multitask profiler subsystem. The contextual embedding layer provides domain specific learning to the various attention models which further helps the attention module to assign domain and context specific contextual mathematical codes to each of the tokens. Upon identification of the context using attention models and the contextual mathematical codes, the attention module may identify a product detail, an issue detail and a customer detail from the customer query.

The method 300 further includes classifying the plurality of tokens into profiles based on the plurality of contextual mathematical codes in step 350. In one embodiment, classifying the plurality of tokens into profiles via a classification subsystem of the multitask profiler subsystem. In some embodiments, classifying the plurality of tokens into the profiles may include classifying the plurality of tokens into a product profile, a issue profile and a customer profile. The profiles are representative of corresponding mathematical contextual codes.

Subsequently, the method 300 includes generating a human readable profile and a machine-readable profile based on the profiles in step 360. The machine-readable profile and the human readable profile include at least one of a customer profile, a product profile and an issue profile or a combination thereof. In one embodiment, generating a human readable profile and a machine-readable profile via profile generator module. In some embodiments, generating the human readable profile may include generating a human readable product profile, a human readable issue profile and a human readable customer profile.

In one embodiment, generating the machine-readable profile may include generating the machine-readable profile by applying one or more mathematical operations on the profiles. In such embodiment, applying the one or more mathematical operations on the profiles may include applying at least one of an average of the plurality of profiles, a weighted average of the plurality of profiles, concatenation of the plurality of profiles or the like or a combination thereof. In a specific embodiment, generating the human readable profile and the machine-readable profile may include generating the human readable profile and the machine-readable profile to generate a response corresponding to the customer query.

Various embodiments of the system for classification of customer query described above enables substantial reduction in the amount of classification processing required. The system provides better accuracy for classifying the customer query without much need of the historical data as compared to the conventional system. The system classifies utilizes the domain specific knowledge using the contextual embedding layer which provides efficient classification results.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for classification of a customer query comprising:
    a processor; and
    a memory coupled to the hardware processor, wherein the memory comprises a set of program instructions in the form of a plurality of subsystems, configured to be executed by the hardware processor, wherein the plurality of subsystems comprises:
- a customer interaction subsystem configured to receive the customer query from a customer;
- a tokenizer subsystem operatively coupled to the customer interaction subsystem, wherein the tokenizer subsystem is configured to split the customer query into a plurality of tokens; and
- a multitask profiler subsystem operatively coupled to the tokenizer subsystem, wherein the multitask profiler subsystem comprises:
  - a mapping module configured to map the plurality of tokens with pre-trained embedding data to assign a plurality of mathematical codes to the corresponding plurality of tokens;
  - an attention module operatively coupled to the mapping module, wherein the attention module is configured to apply a plurality of attention models hierarchically on a contextual embedding layer to obtain a plurality of contextual mathematical codes corresponding to the plurality of tokens based on the plurality of mathematical codes;
  - a classification module operatively coupled to the attention module, wherein the classification module is configured to classify the plurality of tokens into a plurality of profiles based on the plurality of contextual mathematical codes; and
  - a profile generator module operatively coupled to the classification module, wherein the profile generator module is configured to generate a human readable profile and a machine-readable profile based on the plurality of profiles, wherein the machine-readable profile and the human readable profile comprises at least one of a customer profile, a product profile, an issue profile and a combination thereof.

2. The system of claim 1, wherein the customer query comprises at least one of a text and voice of customer interaction.

3. The system of claim 2, wherein the text or voice of the customer interaction comprises at least one of web content, text of a chat session, an email, a short messaging service, a voice call and a voice message.

4. The system of claim 1, wherein the plurality of tokens comprises words, numbers, punctuation marks, phrases, date, email address or universal resource locator (URL).

5. The system of claim 1, wherein the plurality of profiles comprises, a product profile, an issue profile and a customer profile.

6. The system of claim 1, wherein the profile generator module is configured to generate the machine-readable profile based on the plurality of profiles.

7. The system of claim 1, wherein the profile generator module is configured to generate the machine-readable profile by applying a one or more mathematical operations on the plurality of profiles.

8. The system of claim 7, wherein the one or more mathematical operations comprises at least one of an average of the plurality of profiles, a weighted average of the plurality of profiles, concatenation of the plurality of profiles and a combination thereof.

9. The system of claim 1, wherein the machine-readable profile and the human readable profile are configured to generate a response corresponding to the customer query.

10. A method comprising:
- receiving, by a customer interaction subsystem, a customer query from a customer;
- splitting, by a tokenizer subsystem, the customer query into a plurality of tokens;
- mapping, by a mapping module, the plurality of tokens with pre-trained embedding data to assign a plurality of mathematical codes to the corresponding plurality of tokens;
- applying, by an attention module, a plurality of attention models hierarchically on a contextual embedding layer to obtain a plurality of contextual mathematical codes corresponding to the plurality of tokens based on the plurality of mathematical codes;
- classifying, by a classification subsystem, the plurality of tokens into a plurality of profiles based on the plurality of contextual mathematical codes; and
- generating, by profile generator module, a human readable profile and a machine-readable profile based on the plurality of profiles, wherein the machine-readable profile and the human readable profile comprises at least one of a customer profile, a product profile and an issue profile and a combination thereof.

11. The method of claim 10, wherein generating the machine-readable profile comprises applying one or more mathematical operations on the plurality of profiles.

12. The method of claim 11, wherein applying the one or more mathematical operations on the plurality of profiles comprises applying at least one of an average of the of the plurality of profiles, a weighted average on the plurality of profiles, concatenation on the plurality of profiles and a combination thereof.

13. The method of claim 10, wherein generating the human readable profile and the machine-readable profile comprises generating the human readable profile and the machine-readable profile to generate a response corresponding to the customer query.

* * * * *